No. 784,716. PATENTED MAR. 14, 1905.
G. T. VOORHEES.
HEAT INTERCHANGING APPARATUS.
APPLICATION FILED JAN. 26, 1903.
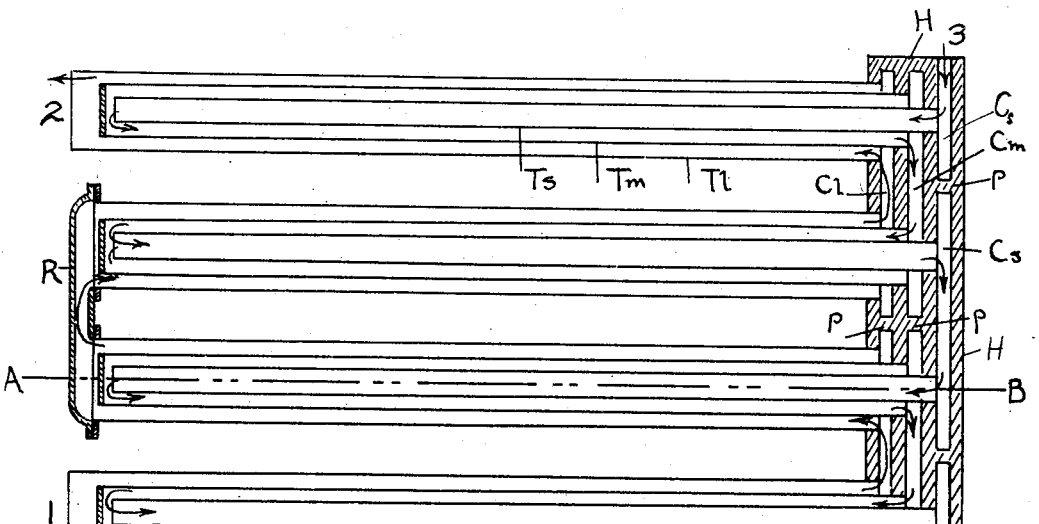
Fig.1
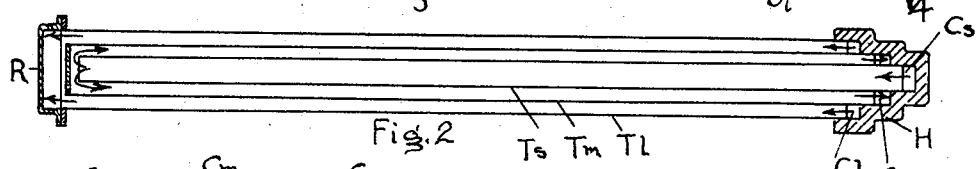
Fig.2
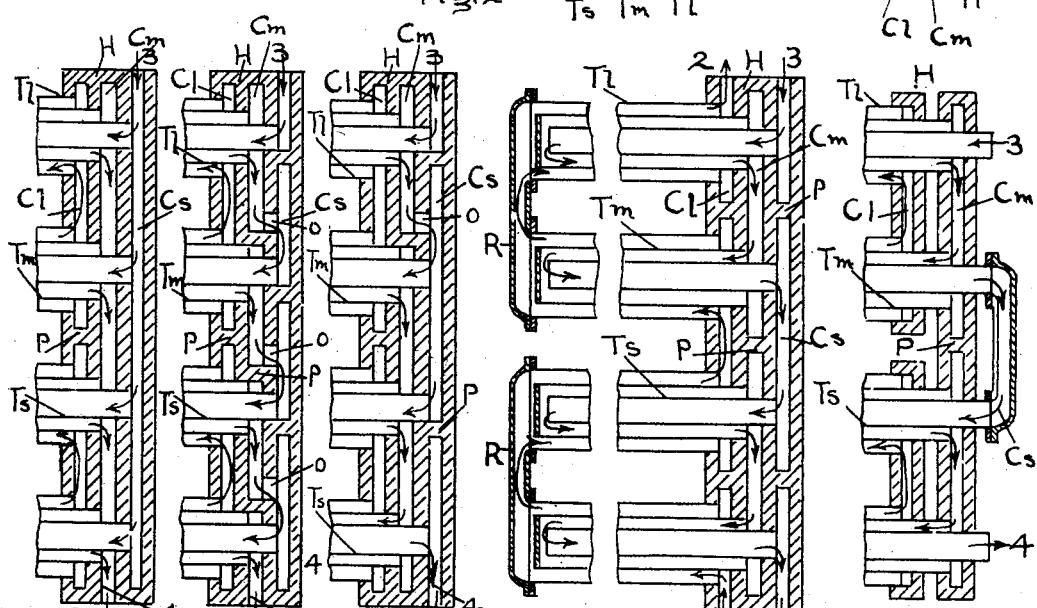

No. 784,716. Patented March 14, 1905.

UNITED STATES PATENT OFFICE.

GARDNER T. VOORHEES, OF BOSTON, MASSACHUSETTS.

HEAT-INTERCHANGING APPARATUS.

SPECIFICATION forming part of Letters Patent No. 784,716, dated March 14, 1905.

Application filed January 26, 1903. Serial No. 140,493.

*To all whom it may concern:*

Be it known that I, GARDNER T. VOORHEES, a citizen of the United States, residing at Boston, in the county of Suffolk and State of Massachusetts, have invented certain new and useful Improvements in Heat-Exchanging Apparatus, of which the following is a specification.

My invention relates to heat-exchanging apparatus, and particularly that type known as "double-pipe." Its principal application will be found in refrigerating apparatus—such as a still, an analyzer, a rectifier, a condenser, a brine-cooler, an absorber, an exchanger, a weak-liquor cooler, a fore-cooler, and the like—where heat is exchanged between a gas or vapor and a liquid, between a gas or vapor and a gas or vapor, or between a liquid and a liquid.

The present known forms of double-pipe heat-exchangers are defective in that when ammonia or any other refrigerant or volatile liquid or gas is used all the joints in the piping have to be rubber packed, and when so packed and exposed to the heat and cold they expand and contract and become leaky.

Now it is the object of my invention to so construct a heat-exchanging apparatus that its joints are metal, are not affected by exposure to heat and cold, and thus much less likely to leak, an apparatus simple in construction, containing few separate parts, and capable of readily being cleaned and repaired.

Figure 1 is a longitudinal section of an exchanger. Fig. 2 is a cross-section on line A B of Fig. 1. Figs. 3, 4, 5 are longitudinal part sections showing modified forms of header. Fig. 6 is a longitudinal section showing modifications in return-bend arrangement. Fig. 7 is a longitudinal part section showing modified forms of tube-chambers. Fig. 8 is a section of a fragment of header, showing a modification when apparatus is used as an absorber.

In the drawings illustrating this principle of my invention and the best mode now known to me of employing said principle, H is a header (see Figs. 1 and 2) divided into three adjacent longitudinal parallel tube-chambers — viz., a large tube-chamber $C_l$, a medium tube-chamber $C_m$, and a small tube-chamber $C_s$. These chambers in turn are divided into subchambers by cross-partitions $p\ p$. One wall of each chamber has a row of openings, to which are fixed the ends of tubes $T_s\ T_m\ T_l$.

$T_s$ is one of a single row of small tubes, each tube being open at both ends.

$T_m$ is one of a single row of medium tubes, each tube being open at one end and closed at the other.

$T_l$ is one of a single row of large tubes, each tube being open at both ends.

R is an individual return-bend connecting the adjacent free ends of two large tubes.

1 is an inlet, and 2 an outlet, for the channel formed by large and medium tubes.

3 is an inlet, and 4 an outlet, for header H.

$W_l$ is a weak-liquor inlet used when the apparatus is operated as an absorber.

The construction of the apparatus is as follows: Header H is cast with its chambers, subchambers, openings, inlets and outlets, and walls of chambers. $C_l$, $C_m$, and $C_s$ are concentrically drilled and tapped to receive the ends of tubes $T_l$, $T_m$, and $T_s$. Each small tube $T_s$ is then screwed into a tapped hole in a wall of small tube-chamber $C_s$. Each medium tube is slipped over a small tube and screwed into a tapped hole in a wall of medium tube-chamber $C_m$. Each large tube is slipped over a medium tube and screwed into a tapped hole in a wall of chamber $C_l$. Return-bends R are fixed to free ends of large tubes $T_l$.

The operation of the apparatus—for example, as a condenser—is as follows: Gas or vapor enters header H at inlet 3, flows to small tube-chamber $C_s$, flows through small tube $T_s$, and back between small tube $T_s$ and medium tube $T_m$ into medium tube-chamber $C_m$. From here it flows back and forth, as indicated by the arrows, in the channel formed by the small and medium tubes, and it as a condensed vapor has an outlet at 4. The condensing-water enters large tube $T_l$ at 1, flows in the channel between the large and medium tubes to the large tube-chamber $C_l$, thence, as shown by arrows, through the other tube-channels, return-bends, and has an outlet in large tube $T_l$ at 2.

It will be noted that the tubes containing the volatile substances are free at one end, and hence cannot by their expansion and contraction strain their header-joints and cause leaks thereat.

The apparatus, as shown in Figs. 1, 2, can also be used as a brine-cooler by having brine enter at 1 and discharge at 2, ammonia entering at 3 and discharging at 4, or ammonia can enter at 4 and discharge at 3.

If so desired, brine can enter at 3 and discharge at 4 or enter at 4 and discharge at 3, the ammonia in this case entering at 1 and discharging at 2 or entering at 2 and discharging at 1.

When used as a still, steam or a hot fluid can enter at 2 and discharge at 1. Strong liquor can enter at 4 and weak liquor and gas can discharge from 3.

When used as an analyzer, water enters at 1 and discharges at 2, gas enters at 3, and gas and liquor discharge at 4.

When used as an exchanger, weak-liquor cooler, or fore-cooler, the operation is similar to that of a brine-cooler.

Fig. 3 shows a modified form of header for condensers where the vapor to be condensed passes the tubes set in parallel in place of in series.

Fig. 4 shows a modified form of header for condensers so arranged that the condensed vapor will freely drain from all parts of the apparatus. O O are holes between chambers $C_m$ and $C_s$.

Fig. 5 shows a modified form of header for condensers where the hot gas is first reduced to a vapor by passing through one or more sets of tubes in series. Then the vapor is condensed by passing through any number of sets of tubes in parallel, and then the resulting liquid of condensation is cooled by passing through one or more sets of tubes in series.

Fig. 6 shows how the inlet and outlet for the channel between the large and medium tubes may be in the header by adding an extra return-bend.

Fig. 7 shows how each tube-chamber may be separate from the other, if so desired.

When used as an absorber, (see Fig. 8,) water enters at 2 and discharges at 1. Gas or vapor enters at 4 and weak liquor at $W_1$. Strong liquor discharges at 3, the extra inlet $W_1$ being designed to be used for injecting weak liquor into the channels formed by the small and medium tubes $T_s$ and $T_m$.

It is evident that this device can have any number of sets of tubes and that any number of sections can be operated as a unit by placing their headers H in line or parallel and connecting by joints or headers similar inlets and outlets. The joints between the tubes and header may be made in any desired manner—as screw, expanded, flange, or packed.

The apparatus can be operated in any desired position—as horizontal, vertical, either end up, upside down, or on a slant.

The various uses to which the apparatus can be put are many, and the various changes in its operation are controlled by very simple mechanical alterations in its construction, such as different locations for partitions $p\ p$, holes $o\ o$, or inlets and outlets 1 2 3 4.

In Fig. 6 if the cross-partitions $p\ p$ in large tube-chamber and return-bends R are omitted it is evident that a fluid, as water, could enter opening 1, the opening 2 being closed, and have outlets from the free end of each tube. Various openings into the sub tube-chambers can be left and provided with plugs or other stoppers, which openings will be useful in cleaning out the apparatus.

I believe my invention to be new and valuable and wish to claim it in the broadest possible manner.

What I claim is—

1. In a heat-exchanging apparatus, a header having three adjacent parallel chambers, one a small tube-chamber, one a medium tube-chamber, and one a large tube-chamber; a single row of small tubes, each tube being open at both ends; a single row of medium tubes, each tube being open at one end, and closed at the other; a single row of large tubes, each tube being open at both ends; one end of each small tube, being fixed to an opening, into the small tube-chamber; the open end of each medium tube being fixed into an opening into the medium tube-chamber; each medium tube partly inclosing a small tube; one end of each large tube, being fixed to an opening into the large tube-chamber; each large tube partly inclosing the medium tube; one or more individual return-bends connecting the adjacent free ends of the large tubes; an inlet and an outlet for the channel, formed by the large and medium tubes; and an inlet and an outlet for the channel, formed by the small and medium tubes.

2. In a heat-exchanging apparatus, a header having three adjacent parallel chambers, one a small tube-chamber, one a medium tube-chamber, and one a large tube-chamber; a single row of small tubes, each tube being open at both ends; a single row of medium tubes, each tube being open at one end, and closed at the other; a single row of large tubes, each tube being open at both ends; one end of each small tube, being fixed to an opening, into the small tube-chamber; the open end of each medium tube, being fixed into an opening into the medium tube-chamber; each medium tube partly inclosing a small tube; one end of each large tube, being fixed to an opening, into the large tube-chamber; each large tube partly inclosing the medium tube; one or more individual return-bends connecting the adjacent free ends of the large tubes; an inlet and an outlet for the channel, formed by the large and medium tubes; an inlet and an outlet for the channel, formed by the small and medium tubes; and one or more cross-partitions that divide the large tube-chamber into subchambers.

3. In a heat-exchanging apparatus, a header having three adjacent parallel chambers, one a small tube-chamber, one a medium tube-chamber, and one a large tube-chamber; a single row of small tubes, each tube being open at both ends; a single row of medium tubes, each tube being open at one end, and closed at the other; a single row of large tubes, each tube being open at both ends; one end of each small tube, being fixed to an opening, into the small tube-chamber; the open end of each medium tube, being fixed into an opening into the medium tube-chamber; each medium tube partly inclosing a small tube; one end of each large tube, being fixed to an opening, into the large tube-chamber; each large tube partly inclosing the medium tube; one or more individual return-bends connecting the adjacent free ends of the large tubes; an inlet and an outlet for the channel, formed by the large and medium tubes; an inlet and an outlet for the channel, formed by the small and medium tubes; one or more cross-partitions that divide the large tube-chambers into subchambers: and one or more cross-partitions that divide each of the medium and small tube-chambers into subchambers.

4. In a heat-exchanging apparatus, a header having three adjacent parallel chambers, one a small tube-chamber, one a medium tube-chamber, and one a large tube-chamber; a single row of small tubes, each tube being open at both ends; a single row of medium tubes, each tube being open at one end, and closed at the other; a single row of large tubes, each tube being open at both ends; one end of each small tube, being fixed to an opening, into the small tube-chamber; the open end of each medium tube, being fixed into an opening into the medium tube-chamber; each medium tube partly inclosing a small tube; one end of each large tube, being fixed to an opening, into the large tube-chamber; each large tube partly inclosing the medium tube; one or more individual return-bends connecting the adjacent free ends of the large tubes; an inlet and an outlet for the channel, formed by the large and medium tubes; an inlet and an outlet for the channel, formed by the small and medium tubes; one or more cross-partitions that divide the large tube-chamber into subchambers; one or more cross-partitions that divide the medium and small tube-chambers into subchambers; and one or more passages between the adjacent subchambers of the small and medium tube-chambers.

In testimony whereof I affix my signature in presence of two witnesses.

GARDNER T. VOORHEES.

Witnesses:
L. J. WING,
N. FINLEY.